United States Patent
Zhou (10) Patent No.: US 10,650,170 B2
(45) Date of Patent: *May 12, 2020

(54) METHOD FOR FINGERPRINT UNLOCKING AND TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/432,886

(22) Filed: Jun. 5, 2019

(65) Prior Publication Data

US 2019/0286855 A1   Sep. 19, 2019

Related U.S. Application Data

(63) Continuation of application No. 16/150,557, filed on Oct. 3, 2018, which is a continuation of application No. PCT/CN2017/079797, filed on Apr. 7, 2017.

(30) Foreign Application Priority Data

Apr. 12, 2016   (CN) .......................... 2016 1 0226693

(51) Int. Cl.
*H04L 29/06* (2006.01)
*G06F 21/84* (2013.01)
(Continued)

(52) U.S. Cl.
CPC .............. *G06F 21/84* (2013.01); *G06F 21/32* (2013.01); *G06K 9/001* (2013.01); *H04L 63/08* (2013.01);
(Continued)

(58) Field of Classification Search
CPC ....... H04L 63/0861; G06F 21/32; G06F 21/84
See application file for complete search history.

(56) References Cited

U.S. PATENT DOCUMENTS

2010/0225607 A1   9/2010   Kim
2012/0071149 A1   3/2012   Bandyopadhyay et al.
(Continued)

FOREIGN PATENT DOCUMENTS

CN   104077518 A   10/2014
CN   104143060 A   11/2014
(Continued)

OTHER PUBLICATIONS

Extended European search report issued in corresponding European application No. 17781844.0 dated Feb. 5, 2019.
(Continued)

*Primary Examiner* — Dao Q Ho
(74) *Attorney, Agent, or Firm* — Young Basile Hanlon & MacFarlane, P.C.

(57) ABSTRACT

A method for fingerprint unlocking is provided. Fingerprint information for an application to be unlocked is acquired, where the fingerprint information is fingerprint ridges. The fingerprint information that is the fingerprint ridges is compared with preset fingerprint information. A display page of the application to be unlocked is refreshed in parallel with comparing the fingerprint information with the preset fingerprint information. A refreshed display page of the application to be unlocked is displayed, when the fingerprint information matches the preset fingerprint information. When the fingerprint information does not match the preset fingerprint information, the display page of the application to be unlocked is stopped to be refreshed. A terminal is also provided.

6 Claims, 6 Drawing Sheets

(51) Int. Cl.
  *G06F 21/32*  (2013.01)
  *H04W 12/06*  (2009.01)
  *G06K 9/00*  (2006.01)

(52) U.S. Cl.
  CPC ..... *H04W 12/06* (2013.01); *G06F 2221/2149* (2013.01)

(56) References Cited

U.S. PATENT DOCUMENTS

| | | |
|---|---|---|
| 2015/0042575 A1 | 2/2015 | Dong |
| 2015/0074615 A1* | 3/2015 | Han .................. G06K 9/00033 715/863 |
| 2015/0135108 A1 | 5/2015 | Pope et al. |
| 2015/0294516 A1 | 10/2015 | Chiang |
| 2015/0324566 A1 | 11/2015 | Miura et al. |
| 2015/0350200 A1* | 12/2015 | Li ....................... H04L 63/0861 726/8 |

FOREIGN PATENT DOCUMENTS

| | | |
|---|---|---|
| CN | 104217151 A | 12/2014 |
| CN | 104239770 A | 12/2014 |
| CN | 104834520 A | 8/2015 |
| CN | 105160228 A | 12/2015 |
| CN | 105389171 A | 3/2016 |

OTHER PUBLICATIONS

International search report issued in corresponding international application No. PCT/CN2017/079797 dated Jul. 14, 2017.

\* cited by examiner

METHOD FOR FINGERPRINT UNLOCKING AND TERMINAL

CROSS-REFERENCE TO RELATED APPLICATION(S)

This application is a continuation of U.S. application Ser. No. 16/150,557, filed on Oct. 3, 2018, which is a continuation of international application No. PCT/CN2017/079797, filed on Apr. 7, 2017, which claims priority to Chinese Patent Application No. 201610226693.5, filed on Apr. 12, 2016, the contents of all of which are herein incorporated by reference in their entireties.

TECHNICAL FIELD

This disclosure relates to the technical field of terminal devices, and particularly to a method for fingerprint unlocking and a terminal.

BACKGROUND

With rapid development of information technology, terminals (such as mobile phones, tablet computers, etc.) are widely used. Fingerprint recognition technology serving as a standard configuration technology of the terminal has been widely applied to unlock the terminal, wakeup the terminal, mobile payment, and so on. Whilst the fingerprint recognition technology is popular, unlocking time of the terminal is an issue that is directly concerned by terminal manufacturers in order to achieve quick unlocking.

In actual use, application unlocking process means that when an application is encrypted, the application needs to be unlocked when a user opens the application after unlocking the terminal. A process of unlocking the application is to perform the entire fingerprint unlocking process first, then execute a main thread to refresh a display page of the application, finally unlock the application, and launch the application. Thus, the efficiency of fingerprint unlocking is disadvantageously affected.

SUMMARY

Implementations of the present disclosure provide a method for fingerprint unlocking and a terminal.

According to a first aspect of the implementations of the present disclosure, a method for fingerprint unlocking is provided. The method includes the follows.

Fingerprint information for an application to be unlocked is acquired, where the fingerprint information is fingerprint ridges. The fingerprint information that is the fingerprint ridges is compared with preset fingerprint information. A display page of the application to be unlocked is refreshed in parallel with comparing the fingerprint information with the preset fingerprint information. A refreshed display page of the application to be unlocked is displayed, when the fingerprint information matches the preset fingerprint information. When the fingerprint information does not match the preset fingerprint information, the display page of the application to be unlocked is stopped to be refreshed. The display page of the application to be unlocked is refreshed in parallel with comparing the fingerprint information with the preset fingerprint information as follows. In the process of comparing the fingerprint information with the preset fingerprint information, the display page of the application to be unlocked is refreshed in parallel when a matching degree between the fingerprint information and the preset fingerprint information reaches a first preset threshold, where the first preset threshold is less than a second preset threshold, the second preset threshold refers to a matching degree when the fingerprint information matches the preset fingerprint information.

According to a second aspect of the implementations of the present disclosure, a terminal is provided. The terminal includes an acquiring unit, a comparing unit, a refreshing unit, a displaying unit, and a stopping unit.

The acquiring unit is configured to acquire fingerprint information for an application to be unlocked, where the fingerprint information is fingerprint ridges.

The comparing unit is configured to compare the fingerprint information acquired by the acquiring unit with preset fingerprint information, where the comparing unit is configured to compare the fingerprint ridges with the preset fingerprint information.

The refreshing unit is configured to refresh a display page of the application to be unlocked in parallel with comparison of the fingerprint information and the preset fingerprint information.

The displaying unit is configured to display a refreshed display page of the application to be unlocked, when the comparison indicates that the fingerprint information matches the preset fingerprint information successfully.

The stopping unit is configured to stop refreshing the display page of the application to be unlocked when the comparison indicates that the fingerprint information does not match the preset fingerprint information.

The refreshing unit is configured to refresh the display page of the application to be unlocked in parallel, when a matching degree between the fingerprint information and the preset fingerprint information reaches a first preset threshold, in the process of comparing the fingerprint information with the preset fingerprint information. The first preset threshold is less than a second preset threshold, and the second preset threshold refers to a matching degree when the fingerprint information matches the preset fingerprint information.

According to a third aspect of the implementations of the present disclosure, a terminal is provided. The terminal includes at least one processor and a computer readable storage coupled to the at least one processor. The computer readable storage is configured to store at least one computer executable instruction thereon which, when executed by the at least one processor, causes the at least one processor to carry out all or part of the actions of any method according to the first aspect of the implementations of the present disclosure.

BRIEF DESCRIPTION OF THE DRAWINGS

In order to illustrate technical solutions of implementations of the present disclosure more clearly, the drawings used in the implementations will be briefly described below. It will be apparent that the drawings described in the following are merely some implementations of the present disclosure, and it will be apparent to those skilled in the art that other drawings can be obtained from the drawings without any creative work.

DETAILED DESCRIPTION

Implementations of the present disclosure provide a method for fingerprint unlocking and a terminal, which can improve the efficiency of fingerprint unlocking.

Technical solutions of the present disclosure will be described clearly and completely with reference to the accompanying drawings; obviously, the implementations described below are merely part of rather than all of the implementations of the present disclosure. Based on the implementations of the present disclosure, other implementations obtained from without any creative work by those of ordinary skill in the art shall fall into the protection scope of the present disclosure.

The terms "first", "second", "third", "fourth", and the like in the specification and claims of the present disclosure and the drawings are used to distinguish different objects rather than describe a specific order. In addition, terms of "including" and "having" and any inflexions thereof are intended to cover a non-exclusive inclusions relationship. For example, processes, methods, systems, products or devices containing a series of operations or units are not limitative to listed processes or units, other processes or units which are not listed can also be included, or other processes or units inherent to these processes, methods, products or devices can also be included.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

A terminal illustrated in the implementations of the present disclosure may include a smart phone (e.g., Android phone, iOS phone, Windows Phone, etc.), a tablet computer, a palmtop computer, a laptop computer, a mobile internet device (MID) or a wearable device. The foregoing terminal is only exemplary rather than exhaustive. The present disclosure includes but is not limited to the foregoing terminal.

Figure 1A:
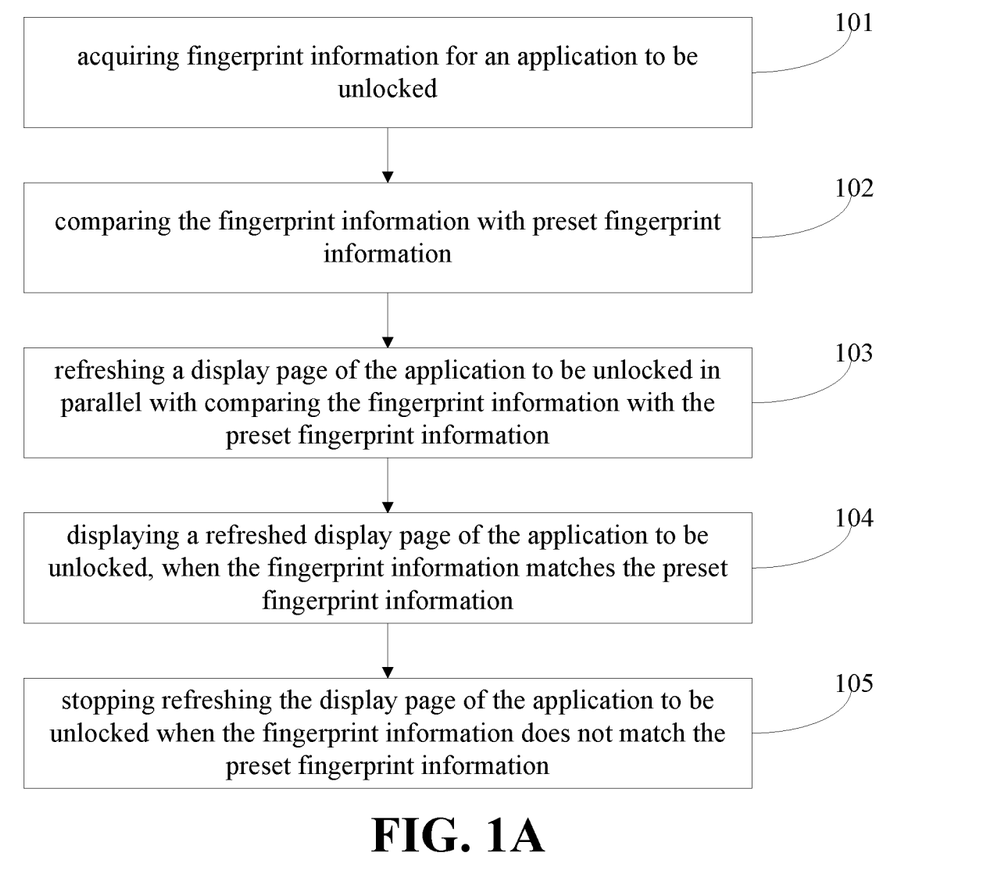
FIG. 1A is a schematic flow chart illustrating a method for fingerprint unlocking according to a first implementation of the present disclosure.

FIG. 1A is a schematic flow chart illustrating a method for fingerprint unlocking according to a first implementation of the present disclosure. Referring to FIG. 1A, the method for fingerprint unlocking described in the implementation of the present disclosure starts with operations at block 101-1.

At block 101-1, fingerprint information for an application to be unlocked is acquired, where the fingerprint information is fingerprint ridges.

At block 102-1, the fingerprint ridges are compared with preset fingerprint information.

At block 103-1, a display page of the application to be unlocked is refreshed in parallel with comparing the fingerprint information with the preset fingerprint information.

At block 104-1, a refreshed display page of the application to be unlocked is displayed, when the fingerprint information matches the preset fingerprint information.

At block 105-1, the display page of the application to be unlocked is stopped to be refreshed when the fingerprint information does not match the preset fingerprint information.

The display page of the application to be unlocked is refreshed in parallel with comparing the fingerprint information with the preset fingerprint information as follows. In the process of comparing the fingerprint information with the preset fingerprint information, the display page of the application to be unlocked is refreshed in parallel when a matching degree between the fingerprint information and the preset fingerprint information reaches a first preset threshold. The first preset threshold is less than a second preset threshold. The second preset threshold refers to a matching degree when the fingerprint information matches the preset fingerprint information.

In an implementation, the display page of the application to be unlocked is refreshed in parallel as follows.

Update-data of the application to be unlocked is obtained in parallel with comparing the fingerprint information with the preset fingerprint information. The display page of the application to be unlocked is refreshed on the basis of the update-data.

Figure 1B:
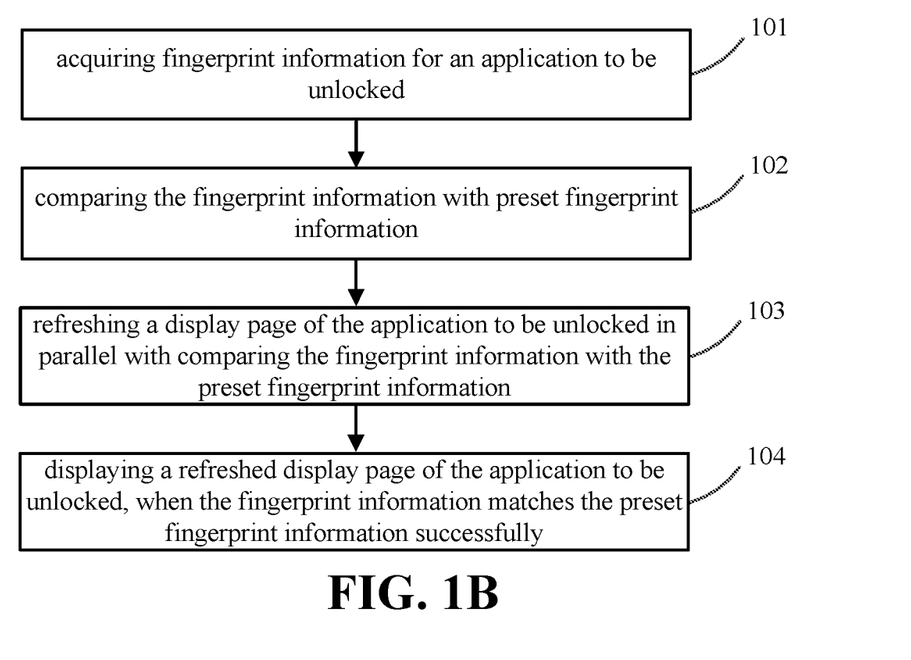
FIG. 1B is a schematic flow chart illustrating a method for fingerprint unlocking according to a first implementation of the present disclosure.

Referring to FIG. 1B, FIG. 1B is a schematic flow chart illustrating a method for fingerprint unlocking according to a first implementation of the present disclosure. The method for fingerprint unlocking described in the implementation of the present disclosure starts with operations at block 101.

At block 101, fingerprint information for an application to be unlocked is acquired.

In one implementation of the present disclosure, the application(s) to be unlocked may include but is not limited to: mailboxes, address books, memos, calendars, weather, maps, settings, games, photo albums, videos, and the like. Normally, users can encrypt important applications of the terminal to prevent important information from being leaked when a terminal such as a mobile phone is lost. When the user opens the application to be unlocked, a prompt message will pop up on a display page of the application to be unlocked. The prompt message is configured to prompt the user to perform fingerprint verification. The terminal may obtain the fingerprint information for the application to be unlocked. The fingerprint information is input by the user and may be a fingerprint image, fingerprint ridges, or fingerprint feature points.

At block 102, the fingerprint information is compared with preset fingerprint information.

The terminal can store the preset fingerprint information in advance. The preset fingerprint information is used in the process of unlocking an application. The terminal may compare the fingerprint information input by the user with the preset fingerprint information, and display a refreshed display page of the application to be unlocked when the fingerprint information matches the preset fingerprint information successfully. The fingerprint information can include at least one of: a fingerprint image, fingerprint ridges, and fingerprint feature points. In an implementation, the fingerprint information is a fingerprint image, and a matching value between the fingerprint image and a preset fingerprint image can be compared. When the matching value reaches a certain threshold, it indicates that the fingerprint image matches the preset fingerprint image successfully. On the other hand, when the matching value does not reach the certain threshold, it indicates that the fingerprint image does not match the preset fingerprint image. In an implementation, the fingerprint information is fingerprint ridges. Similarly, when the fingerprint information is compared with the preset fingerprint information, the fingerprint ridges can be compared with preset fingerprint ridges. When a matching value reaches a certain threshold, it indicates that the fingerprint ridges match the preset fingerprint ridges successfully. When the matching value does not reach the certain threshold, it indicates that the fingerprint ridges do not match the preset fingerprint ridges. In an implementation, the fingerprint information is fingerprint feature points. Before the fingerprint information is compared with the preset fingerprint information, fingerprint feature points such as Harris corners and scale-invariant feature transform (SIFT) corners of the fingerprint information can be extracted. Fingerprint feature points of the acquired fingerprint information can be compared with fingerprint feature points of the preset fingerprint information. When a matching value reaches a certain threshold, it can be determined that the fingerprint feature points of the fingerprint information are successfully matched with the fingerprint feature points of the preset fingerprint information. When the matching value does not reach the certain threshold, it can be determined that the fingerprint feature points of the fingerprint information do not match the fingerprint feature points of the preset fingerprint information.

At block 103, a display page of the application to be unlocked is refreshed in parallel with comparing the fingerprint information with the preset fingerprint information.

In an implementation of the present disclosure, the terminal may perform operations at block 102 and operations at block 103 in two processes. One process is configured to compare the fingerprint information with the preset fingerprint information, and the other process is configured to refresh the display page of the application to be unlocked in parallel with the execution of the first process.

In an implementation, the terminal may refresh the display page of the application to be unlocked in parallel at a certain point, the certain time point is after a time when comparison of the fingerprint information and the preset fingerprint information begins and before the end of fingerprint unlocking.

In an implementation, the fingerprint information is the fingerprint image. In the process of comparing the fingerprint information with the preset fingerprint information, the terminal can divide the fingerprint image into several parts, and the terminal may compare each part of the fingerprint image sequentially. When an area that is successfully matched in the fingerprint image is greater than a first preset threshold (when the fingerprint information is the fingerprint image, the first preset threshold can refer to a threshold A), the display page of the application to be unlocked is refreshed in parallel. The first preset threshold may be a specific value set by the user, or the first preset threshold may be determined according to the size of the fingerprint image or the preset fingerprint image. For example, the first preset threshold is 20% of the area of the fingerprint image, or the first preset threshold is 20% of the area of the preset fingerprint image.

In an implementation, the fingerprint information is the fingerprint image. In the process of comparing the fingerprint information with the preset fingerprint information, when a matching value between the fingerprint information and the preset fingerprint information does not reach the first preset threshold, the display page of the application to be unlocked will not be refreshed. In one implementation, a matching value when the fingerprint information matches the preset fingerprint information successfully may be referred to as a second preset threshold (when the fingerprint information is the fingerprint image, the second preset threshold can refer to a threshold B). Fingerprint match thresholds may change in different application scenarios. For example, in a scenario of fingerprint payment, the fingerprint match threshold needs to be relatively high, and in a scenario of fingerprint unlock, the fingerprint match threshold is lower than that in the scenario of fingerprint payment. Based on the above, the second preset threshold may be 100%, 90%, and the like, which will be not limited herein. The first preset threshold is less than the second preset threshold. When the matching value between the fingerprint information and the preset fingerprint image is less than the first preset threshold, it indicates that the fingerprint information does not match the preset fingerprint information, the fingerprint unlocking will not be performed, and the display page of the application to be unlocked will not be refreshed, which can reduce the power consumption of the terminal.

In an implementation, the fingerprint information is one of fingerprint ridges and fingerprint feature points. In the process of comparing the fingerprint information with the preset fingerprint information, when a matching value between the fingerprint information and the preset fingerprint information reaches a third preset threshold (when the fingerprint information is one of fingerprint ridges and fingerprint feature points, the third preset threshold can refer to a threshold C), the display page of the application to be unlocked is refreshed in parallel. The third preset threshold may be a specific value set by the user.

In an implementation, the fingerprint information is one of fingerprint ridges and fingerprint feature points. In the process of comparing the fingerprint information with the preset fingerprint information, when a matching value between the fingerprint information and the preset fingerprint information does not reach the third preset threshold, the display page of the application to be unlocked will not be refreshed. In one implementation, a matching value when the fingerprint information matches the preset fingerprint information successfully may be referred to as a fourth preset threshold (when the fingerprint information is one of fingerprint ridges and fingerprint feature points, the fourth preset threshold can refer to a threshold D). The third preset threshold is less than the fourth preset threshold. When the matching value between the fingerprint information and the preset fingerprint image is less than the third preset threshold, it indicates that the fingerprint information does not match the preset fingerprint information, the fingerprint unlocking will not be performed, and the display page of the application to be unlocked will not be refreshed, which can reduce the power consumption of the terminal.

In another implementation, when the terminal refreshes of the display page of the application to be unlocked, the terminal may first obtain update-data of the application to be unlocked. That is, in the process of updating the application to be unlocked, only update-data rather than page data of the entire page needs to be refreshed. This makes it possible to shorten refreshing time of the display page of the application to be unlocked and reduce the power consumption of the terminal. The terminal may monitor data of the application to be unlocked at regular intervals to determine which part of the page data of the application to be unlocked needs to be refreshed, so as to obtain the update-data. In an implementation, the terminal may also refresh all data of the display page of the application to be unlocked.

At block 104, a refreshed display page of the application to be unlocked is displayed, when the fingerprint information matches the preset fingerprint information successfully.

In the implementation of the present disclosure, when the fingerprint information matches the preset fingerprint information successfully, the terminal may display the refreshed display page of the application to be unlocked. In an implementation, the refreshed display page of the application to be unlocked will be displayed after the fingerprint is matched successfully despite the fact that the display page of the application to be unlocked has been refreshed before the fingerprint comparison is completed. In another implementation, if the display page of the application to be unlocked has not been refreshed completely after the fingerprint is matched successfully, the terminal may not display the refreshed display page of the application to be unlocked after the fingerprint information matches the preset fingerprint information successfully, until the display page is refreshed completely.

In an implementation, when the fingerprint information does not match the preset fingerprint information and the display page of the application to be unlocked has not been refreshed completely, the terminal may stop refreshing the display page of the application to be unlocked. Further, the terminal may also save the display page of the application to be unlocked that has not been refreshed completely, so that when the display page of the application to be unlocked needs to be refreshed next time, the terminal may conduct refreshing directly on the basis of the display page of the application to be unlocked that has not been refreshed completely.

In an implementation, the terminal may acquire the fingerprint information for the application to be unlocked, and refresh the display page of the application to be unlocked in parallel with acquiring the fingerprint information for the application to be unlocked. The above-mentioned process can be executed separately in two processes. The first process is to acquire the fingerprint information for the application to be unlocked and compare the fingerprint information with preset fingerprint information. The second process is to refresh the display page of the application to be unlocked, and display the refreshed display page of the application to be unlocked when the fingerprint information matches the preset fingerprint information successfully. Time required for acquiring the fingerprint information is relatively shorter compared with time required for the fingerprint comparison.

By means of the implementations of the present disclosure, fingerprint information for an application to be unlocked is acquired. Further, the fingerprint information is compared with preset fingerprint information. A display page of the application to be unlocked is refreshed in parallel with comparing the fingerprint information with the preset fingerprint information. Then, a refreshed display page of the application to be unlocked is displayed, when the fingerprint information matches the preset fingerprint information successfully. The display page of the application to be unlocked is refreshed in parallel with fingerprint comparing. Since the fingerprint comparing and the display page refreshing are performed in parallel, compared to the related art in which time for application unlocking includes time for fingerprint unlocking and time for refreshing the application to be unlocked, here, time for unlocking the application to be unlocked can be shortened and the unlocking efficiency can be improved. Moreover, power consumption, caused by refreshing the display page of the application to be unlocked when the unlocking is unsuccessful, can be reduced.

Figure 2:
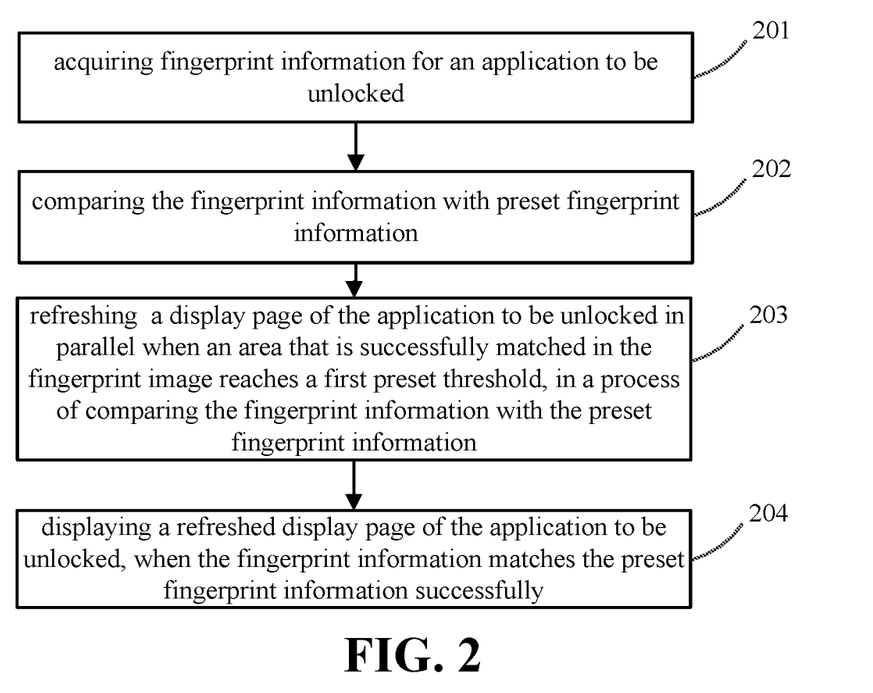
FIG. 2 is a schematic flow chart illustrating a method for fingerprint unlocking according to a second implementation of the present disclosure.

Referring to FIG. 2, FIG. 2 is a schematic flow chart illustrating a method for fingerprint unlocking according to a second implementation of the present disclosure. The method for fingerprint unlocking described in the implementation of the present disclosure starts with operations at block 201.

At block 201, fingerprint information for an application to be unlocked is acquired.

At block 202, the fingerprint information is compared with preset fingerprint information.

At block 203, in the process of comparing the fingerprint information which is a fingerprint image with the preset fingerprint information, a display page of the application to be unlocked is refreshed in parallel when an area that is successfully matched in the fingerprint image reaches a first preset threshold.

In an implementation, the fingerprint information is the fingerprint image. In the process of comparing the fingerprint information with the preset fingerprint information, the terminal can divide the fingerprint image into several parts, and the terminal may compare each part of the fingerprint image sequentially. When the area that is successfully matched in the fingerprint image is greater than the first preset threshold, the display page of the application to be unlocked is refreshed in parallel. The first preset threshold may be a specific value set by the user, or the first preset threshold may be determined according to the size of the fingerprint image, for example, the first preset threshold is 20% of the area of the fingerprint image. When the area that is successfully matched in the fingerprint image reaches the first preset threshold, the process of fingerprint comparing is still going on, and the process of fingerprint comparing does not end until the fingerprint is matched successfully or the entire fingerprint image is compared.

In an implementation, the fingerprint information is the fingerprint image. In the process of comparing the fingerprint information with the preset fingerprint information, when the matching area that is successfully matched in the fingerprint image does not reach the first preset threshold, the display page of the application to be unlocked will not be refreshed. In one implementation, a matching area when the fingerprint information matches the preset fingerprint information successfully may be referred to as a second preset threshold. The first preset threshold is less than the second preset threshold. When the matching area in the fingerprint image that is successfully matched with the preset fingerprint information is less than the first preset threshold, it indicates that the fingerprint information does not match the preset fingerprint information, the fingerprint unlocking will not be performed, and the display page of the application to be unlocked will not be refreshed, which can reduce the power consumption of the terminal.

In another implementation, when the terminal refreshes of the display page of the application to be unlocked, the terminal may first obtain update-data of the application to be unlocked. In other words, in the process of updating the application to be unlocked, only update-data rather than page data of the entire page needs to be refreshed. This makes it possible to shorten refreshing time of the display page of the application to be unlocked and reduce the power consumption of the terminal. The terminal may monitor data of the application to be unlocked at regular intervals to determine which part of the page data of the application to be unlocked needs to be refreshed.

At block 204, a refreshed display page of the application to be unlocked is displayed, when the fingerprint information matches the preset fingerprint information successfully.

By means of the implementations of the present disclosure, fingerprint information for an application to be unlocked is acquired, and the fingerprint information is compared with preset fingerprint information. The fingerprint information is a fingerprint image. In the process of comparing the fingerprint information with the preset fingerprint information, a display page of the application to be unlocked is refreshed in parallel when an area reaches a first preset threshold. The area is successfully matched in the fingerprint image. Then, a refreshed display page of the application to be unlocked is displayed, when the fingerprint information matches the preset fingerprint information successfully. Therefore, the display page of the application to be unlocked is refreshed in parallel with fingerprint comparing, since the fingerprint comparing and the display page refreshing are performed in parallel, this makes it possible to shorten time for unlocking the application and improve the unlocking efficiency. Moreover, power consumption, caused by refreshing the display page of the application to be unlocked when the unlocking is unsuccessful, can be reduced.

Figure 3:
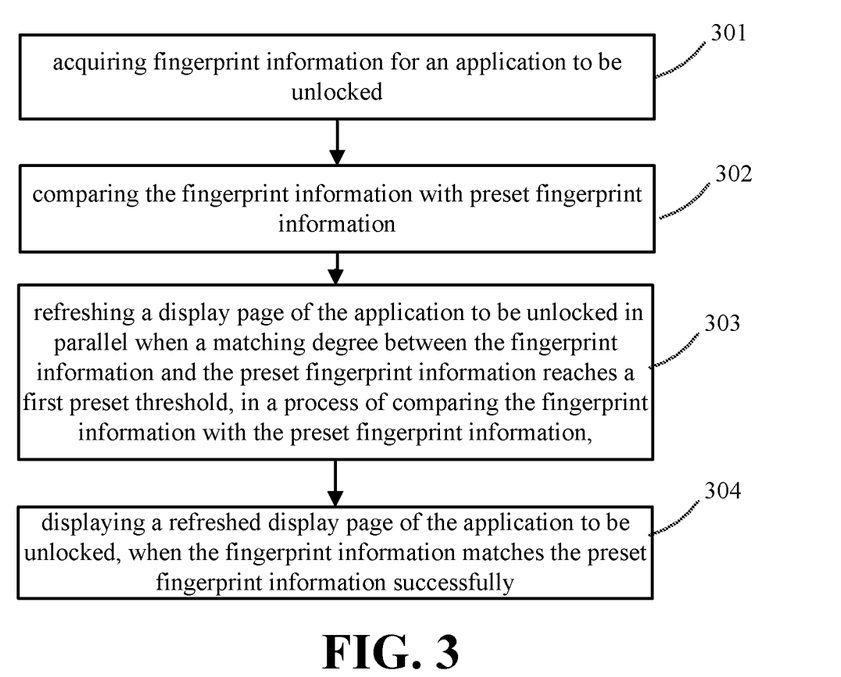
FIG. 3 is a schematic flow chart illustrating a method for fingerprint unlocking according to a third implementation of the present disclosure.

Referring to FIG. 3, FIG. 3 is a schematic flow chart illustrating a method for fingerprint unlocking according to a third implementation of the present disclosure. The method for fingerprint unlocking described in the implementation of the present disclosure starts with operations at block 301.

At block 301, fingerprint information for an application to be unlocked is acquired.

At block 302, the fingerprint information is compared with preset fingerprint information.

At block 303, in the process of comparing the fingerprint information with the preset fingerprint information, a display page of the application to be unlocked is refreshed in parallel when a matching value between the fingerprint information and the preset fingerprint information reaches a third preset threshold.

In an implementation, in the process of comparing the fingerprint information with the preset fingerprint information, when a matching value between the fingerprint information and the preset fingerprint image reaches the third preset threshold, the display page of the application to be unlocked is refreshed. The third preset threshold may include but is limited to 30%, 34%, 36.5%, 50%, 56%, 80%, 85%, and the like. When the matching value between the fingerprint information and the preset fingerprint image reaches the third preset threshold, the process of fingerprint comparing is still going on. The process of fingerprint comparing does not end until the fingerprint is matched successfully or the entire fingerprint information has been compared.

In an implementation, in the process of comparing the fingerprint information with the preset fingerprint information, when the matching value between the fingerprint information and the preset fingerprint image does not reach the third preset threshold, the display page of the application to be unlocked is not refreshed. In one implementation, a matching value when the fingerprint information matches the preset fingerprint information successfully may be referred to as a fourth preset threshold. The third preset threshold is less than the fourth preset threshold. The third preset threshold is a matching value when the fingerprint information does not match the preset fingerprint information successfully. When the matching value between the fingerprint information and the preset fingerprint image is less than the third preset threshold, it indicates that the fingerprint information does not match the preset fingerprint information, the fingerprint unlocking will not be performed, and the display page of the application to be unlocked will not be refreshed, which can reduce the power consumption of the terminal.

In another implementation, when the terminal refreshes of the display page of the application to be unlocked, the terminal may first obtain update-data of the application to be unlocked. That is, in the process of updating the application to be unlocked, only update-data rather than all page data needs to be refreshed. This makes it possible to not only shorten refreshing time of the display page of the application to be unlocked, but also reduce the power consumption of the terminal. The terminal may monitor data of the application to be unlocked at regular intervals to determine which part of the page data of the application to be unlocked needs to be refreshed.

At block 304, a refreshed display page of the application to be unlocked is displayed, when the fingerprint information matches the preset fingerprint information successfully.

By means of the implementations of the present disclosure, fingerprint information for an application to be unlocked is acquired, and the fingerprint information is compared with preset fingerprint information. In the process of comparing the fingerprint information with the preset fingerprint information, a display page of the application to be unlocked is refreshed in parallel when a matching value between the fingerprint information and the preset fingerprint information reaches a third preset threshold. A refreshed display page of the application to be unlocked is displayed, when the fingerprint information matches the preset fingerprint information successfully. Therefore, the display page of the application to be unlocked is refreshed in parallel with fingerprint comparing, since the display page is refreshed in parallel when the matching value of the fingerprint matching reaches a certain threshold, this makes it possible to shorten time for unlocking the application and improve the unlocking efficiency. Moreover, power consumption, caused by refreshing the display page of the application to be unlocked when the unlocking is unsuccessful, can be reduced.

Figure 4:
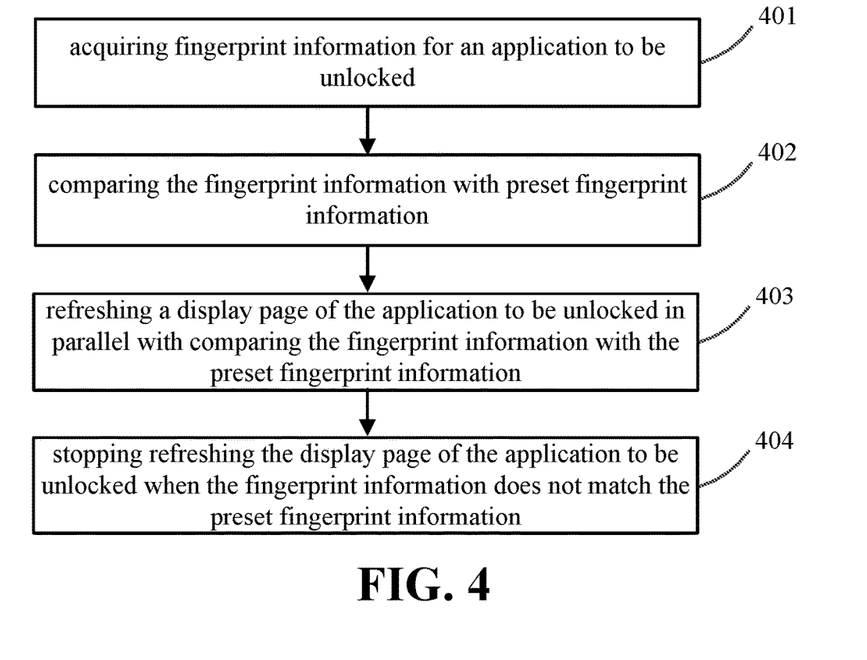
FIG. 4 is a schematic flow chart illustrating a method for fingerprint unlocking according to a fourth implementation of the present disclosure.

Referring to FIG. 4, FIG. 4 is a schematic flow chart illustrating a method for fingerprint unlocking according to a fourth implementation of the present disclosure. The method for fingerprint unlocking described in the implementation of the present disclosure starts with operations at block 401.

At block 401, fingerprint information for an application to be unlocked is acquired.

At block 402, the fingerprint information is compared with preset fingerprint information.

At block 403, a display page of the application to be unlocked is refreshed in parallel with comparing the fingerprint information with the preset fingerprint information.

At block 404, refreshing the display page of the application to be unlocked is stopped when the fingerprint information does not match the preset fingerprint information.

In the implementation of the present disclosure, when the fingerprint information does not match the preset fingerprint information and the display page of the application to be unlocked has not been refreshed completely, the terminal may stop refreshing the display page of the application to be unlocked. Further, the terminal may also save the display page of the application to be unlocked that has not been refreshed completely, so that when the display page of the application to be unlocked needs to be refreshed next time, the terminal may conduct refreshing directly on the basis of the display page of the application to be unlocked. The display page of the application to be unlocked has not been refreshed completely.

By means of the implementations of the present disclosure, fingerprint information for an application to be unlocked is acquired. Then, the fingerprint information is compared with preset fingerprint information. A display page of the application to be unlocked is refreshed in parallel with comparing the fingerprint information with the preset fingerprint information. Further, refreshing the display page of the application to be unlocked is stopped when the fingerprint information does not match the preset fingerprint information. Therefore, the display page of the application to be unlocked is refreshed in parallel with fingerprint comparing. Refreshing the display page of the application to be unlocked is stopped when the fingerprint information does not match the preset fingerprint information. In this way, power consumption, caused by refreshing the display page of the application to be unlocked when the unlocking is unsuccessful, can be reduced.

Figure 5A:
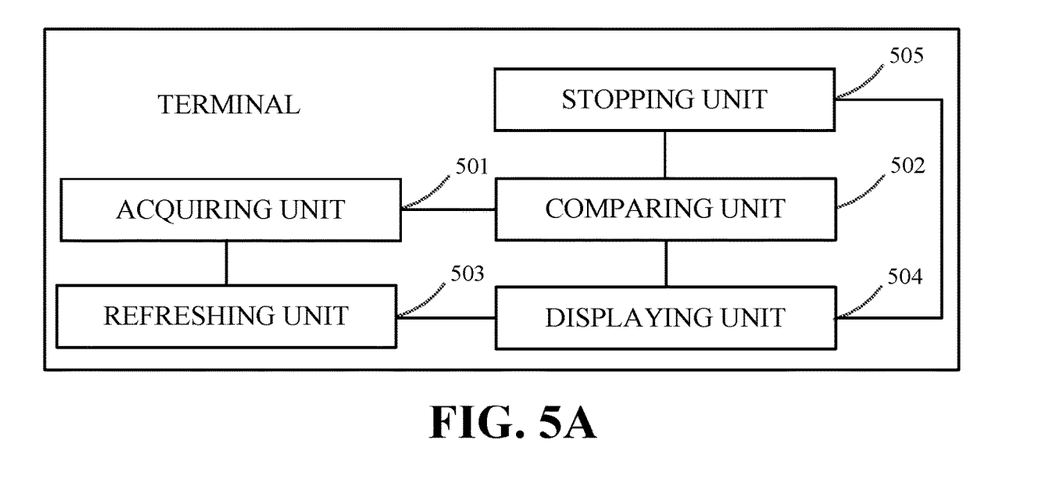
FIG. 5A is a schematic structural diagram illustrating a terminal according to a first implementation of the present disclosure.

Referring to FIG. 5A, FIG. 5A is a schematic structural diagram illustrating a terminal according to a first implementation of the present disclosure. The terminal described in the implementation of the present disclosure includes an acquiring unit 501, a comparing unit 502, a refreshing unit 503, a displaying unit 504, and a stopping unit 505.

The acquiring unit 501 is configured to acquire fingerprint information for an application to be unlocked, where the fingerprint information is fingerprint ridges.

The comparing unit 502 is configured to compare the fingerprint information acquired by the acquiring unit 501 with preset fingerprint information, where the comparing unit 502 is configured to compare the fingerprint ridges with the preset fingerprint information.

The refreshing unit 503 is configured to refresh a display page of the application to be unlocked in parallel with the comparing unit 502 comparing the fingerprint information with the preset fingerprint information.

The displaying unit 504 is configured to display a refreshed display page of the application to be unlocked refreshed by the refreshing unit 503, when a comparison result of the comparing unit 502 is that the fingerprint information matches the preset fingerprint information successfully.

The stopping unit 505 is configured to stop refreshing the display page of the application to be unlocked when a comparison result of the comparing unit 502 is that the fingerprint information does not match the preset fingerprint information.

The refreshing unit 503 is configured to refresh the display page of the application to be unlocked in parallel, when a matching degree between the fingerprint information and the preset fingerprint information reaches a first preset threshold, in the process of comparing the fingerprint information with the preset fingerprint information. The first preset threshold is less than a second preset threshold. The second preset threshold refers to a matching degree when the fingerprint information matches the preset fingerprint information.

In an implementation, the fingerprint information is a fingerprint image. The refreshing unit 503 is configured to refresh the display page of the application to be unlocked in parallel when an area that is successfully matched in the fingerprint image reaches a first preset threshold, in the process of comparing the fingerprint information with the preset fingerprint information.

In an implementation, the fingerprint information is one of fingerprint ridges and fingerprint feature points. The refreshing unit 503 is configured to refresh the display page of the application to be unlocked in parallel when a matching value between the fingerprint information and the preset fingerprint information reaches a third preset threshold, in the process of comparing the fingerprint information with the preset fingerprint information.

Figure 5B:
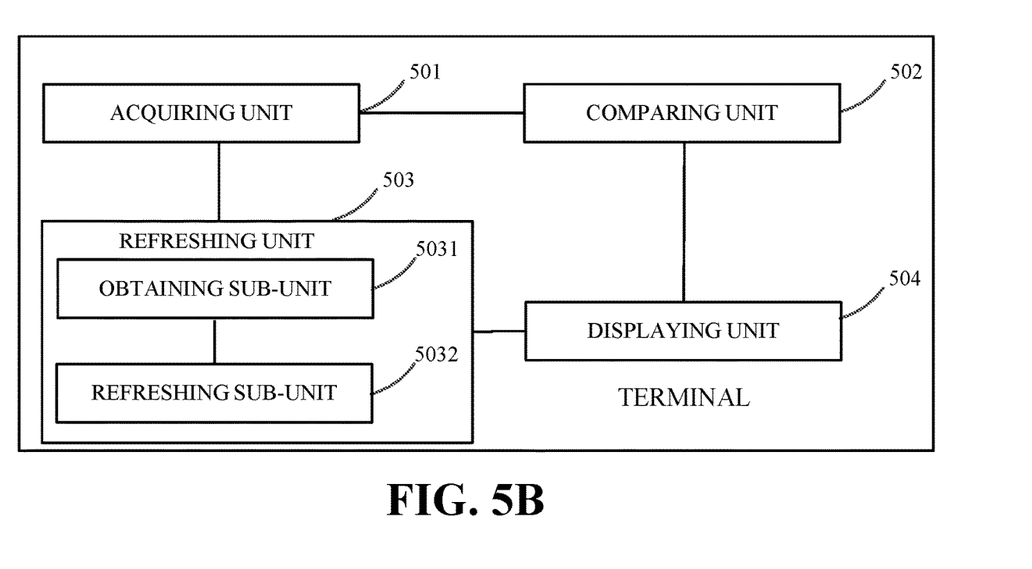
FIG. 5B is another schematic structural diagram illustrating a terminal according to the first implementation of the present disclosure.

In another implementation, as illustrated in FIG. 5B, the refreshing unit 503 of the terminal illustrated in FIG. 5A can include an obtaining sub-unit 5031 and a refreshing sub-unit 5032.

The obtaining sub-unit 5031 is configured to obtain update-data of the application to be unlocked in parallel with the comparing unit 502 comparing the fingerprint information with the preset fingerprint information.

The refreshing sub-unit 5032 is configured to refresh the display page of the application to be unlocked on the basis of the update-data obtained by the obtaining sub-unit 5031.

By means of the terminal described in the implementations of the present disclosure, fingerprint information for an application to be unlocked is acquired. Then, the fingerprint information is compared with preset fingerprint information. Further, a display page of the application to be unlocked is refreshed in parallel with comparing the fingerprint information with the preset fingerprint information. A refreshed display page of the application to be unlocked is displayed, when the fingerprint information matches the preset fingerprint information successfully. Therefore, the display page of the application to be unlocked is refreshed in parallel with fingerprint comparing. Since the fingerprint comparing and the display page refreshing are performed in parallel, this makes it possible to shorten unlocking time of the application to be unlocked and improve unlocking efficiency.

The acquiring unit 501 can be a fingerprint recognition sensor or a camera. The comparing unit 502, the he refreshing unit 503, and the stopping unit 505 can be an application-specific integrated circuit (ASIC), a processor, a memory configured to implement one or more software or hardware programs, a integrated logical circuit, and/or other devices that can provide above functions. The displaying unit 504 can be a display screen of the terminal.

As another example, the above units and sub-units can be realized through one or more processors, for example, the above units can be integrated in one processor, or can be distributed among different processors.

Figure 6:
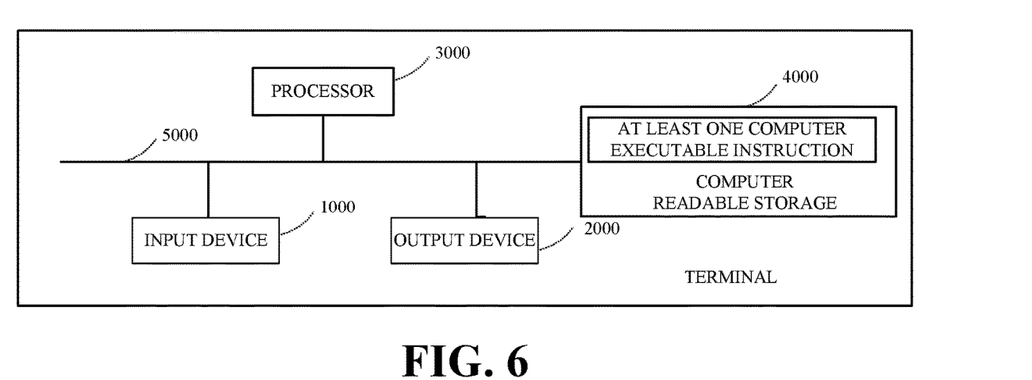
FIG. 6 is a schematic structural diagram illustrating a terminal according to a second implementation of the present disclosure.

FIG. 6 is a schematic structure diagram of a terminal according to a second implementation of the present disclosure. The terminal illustrated in the implementation may include at least one input device 1000, at least one output device 2000, at least one processor 3000 (such as a central processing unit (CPU)), and a computer readable storage 4000. The input device 1000, the output device 2000, the processor 3000, and the computer readable storage 4000 are coupled together via a bus 5000.

The input device 1000 may be a touch panel, a physical key, a mouse, a fingerprint recognition module, etc.

The output device 2000 may be a display screen.

The computer readable storage 4000 may be a high-speed random access memory (RAM), or may be a non-volatile memory such as a disk memory. The computer readable storage 4000 is configured to store a set of program codes.

The input device 1000 is configured to evoke the program codes stored in the memory to carry out the following actions: acquiring fingerprint information for an application to be unlocked, where the fingerprint information is fingerprint ridges.

The processor 3000 is caused to carry out the following actions: comparing the fingerprint information which is fingerprint ridges with preset fingerprint information, refreshing a display page of the application to be unlocked in parallel with comparing the fingerprint information with the preset fingerprint information, displaying a refreshed display page of the application to be unlocked when the fingerprint information matches the preset fingerprint information, and stopping refreshing the display page of the application to be unlocked when the fingerprint information does not match the preset fingerprint information.

The processor 3000 carrying out the action of refreshing the display page of the application to be unlocked in parallel with comparing the fingerprint information with the preset fingerprint information is caused to carry out actions: refreshing the display page of the application to be unlocked in parallel when a matching value between the fingerprint information and the preset fingerprint information reaches a first preset threshold, in the process of comparing the fingerprint information with the preset fingerprint information.

The first preset threshold is less than a second preset threshold. The second preset threshold refers to a matching value when the fingerprint information matches the preset fingerprint information.

In an implementation, the fingerprint information is a fingerprint image, the processor 3000 carrying out the action of refreshing the display page of the application to be unlocked in parallel with comparing the fingerprint information with the preset fingerprint information is caused to carry out actions: refreshing the display page of the application to be unlocked in parallel when an area that is successfully matched in the fingerprint image reaches a first preset threshold, in the process of comparing the fingerprint information with the preset fingerprint information.

The first preset threshold is less than a second preset threshold, and the second preset threshold refers to a matching area when the fingerprint information matches the preset fingerprint information successfully.

In an implementation, the processor 3000 carrying out the action of refreshing the display page of the application to be unlocked in parallel is caused to carry out actions: obtaining update-data of the application to be unlocked in parallel with comparing the fingerprint information with the preset fingerprint information and refreshing the display page of the application to be unlocked on the basis of the update-data.

In a specific implementation, the input device 1000, the output device 2000, and the processor 3000 can be configured to implement implementations described in the first, second, third, and fourth implementation of the method for fingerprint unlocking of the implementations of the present disclosure. The input device 1000, the output device 2000, and the processor 3000 can also be configured to implement implementations described in the first and second implementation of the terminal of the implementations of the present disclosure, which will not be described in detail herein.

The implementations of the present disclosure also provide a non-transitory computer-readable storage medium. The non-transitory computer-readable storage medium stores computer programs which, when executed by a processor, causes the processor to carry out all or part of the actions of any method for fingerprint unlocking described in the above-described implementations.

In the foregoing implementations, the description of each implementation has its own emphasis. For the parts not described in detail in one implementation, reference may be made to related descriptions in other implementations.

It is to be noted that, for the sake of simplicity, the foregoing implementations are described as a series of action combinations; however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The non-transitory memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for application unlocking, comprising:
acquiring fingerprint information for an application to be unlocked, the fingerprint information being fingerprint ridges;
performing actions of comparing the fingerprint information with preset fingerprint information and refreshing a display page of the application to be unlocked in parallel;
displaying a refreshed display page of the application to be unlocked, when the fingerprint information matches the preset fingerprint information;
stopping refreshing the display page of the application to be unlocked, when the fingerprint information does not match the preset fingerprint information and the display page of the application to be unlocked has not been refreshed completely; and
saving the display page of the application to be unlocked that has not been refreshed completely;
wherein performing actions of comparing the fingerprint information with the preset fingerprint information and refreshing the display page of the application to be unlocked in parallel comprising:
comparing the fingerprint ridges with the preset fingerprint information; and
refreshing the display page of the application to be unlocked while continuing performing the action of comparing the fingerprint ridges with the preset fingerprint information, when a matching degree between the fingerprint information and the preset fingerprint information reaches a first preset threshold before a fingerprint comparison is completed, wherein the first preset threshold is less than a second preset threshold, and the second preset threshold refers to a matching degree when the fingerprint information matches the preset fingerprint information;
wherein displaying the refreshed display page of the application to be unlocked, when the fingerprint information matches the preset fingerprint information comprising:
displaying the refreshed display page of the application to be unlocked, when the fingerprint information matches the preset fingerprint information and the display page of the application to be unlocked has been refreshed completely.

2. The method of claim 1, wherein refreshing the display page of the application to be unlocked comprises:
obtaining update-data of the application to be unlocked; and
refreshing the display page of the application to be unlocked on the basis of the update-data.

3. A non-transitory computer-readable storage medium storing a computer program which, when executed by a processor, causes the processor to:
acquire fingerprint information for an application to be unlocked, the fingerprint information being fingerprint ridges;
perform actions of comparing the fingerprint information acquired with preset fingerprint information and refreshing a display page of the application to be unlocked in parallel;
display a refreshed display page of the application to be unlocked, when a fingerprint comparison indicates that the fingerprint information matches the preset fingerprint information successfully;
stop refreshing the display page of the application to be unlocked, when the fingerprint comparison indicates that the fingerprint information does not match the preset fingerprint information and the display page of the application to be unlocked has not been refreshed completely; and
save the display page of the application to be unlocked that has not been refreshed completely;
wherein the computer program executed by the processor to perform the actions of comparing the fingerprint information acquired with the preset fingerprint information and refreshing the display page of the application to be unlocked in parallel is executed by the processor to:
compare the fingerprint ridges with the preset fingerprint information; and
refresh the display page of the application to be unlocked while continuing performing the action of comparing the fingerprint ridges with the preset fingerprint information, when a matching degree between the fingerprint information and the preset fingerprint information reaches a first preset threshold before the fingerprint comparison is completed, wherein the first preset threshold is less than a second preset threshold, and the second preset threshold refers to a matching degree when the fingerprint information matches the preset fingerprint information;
wherein the computer program executed by the processor to display the refreshed display page of the application to be unlocked, when the fingerprint comparison indicates that the fingerprint information matches the preset fingerprint information is executed by the processor to:
display the refreshed display page of the application to be unlocked, when the fingerprint information matches the preset fingerprint information and the display page of the application to be unlocked has been refreshed completely.

4. The non-transitory computer-readable storage medium of claim 3, wherein the computer program executed by the processor to refresh the display page of the application to be unlocked is executed by the processor to:
obtain update-data of the application to be unlocked; and
refresh the display page of the application to be unlocked on the basis of the update-data obtained.

5. A terminal, comprising:
a memory storing executable program codes;
a processor coupled with the memory;
the processor being configured to evoke the executable program codes stored in the memory to:
acquire fingerprint information for an application to be unlocked, the fingerprint information being fingerprint ridges;

performing actions of comparing the fingerprint information which is the fingerprint ridges with preset fingerprint information and refreshing a display page of the application to be unlocked in parallel; and display a refreshed display page of the application to be unlocked, when the fingerprint information matches the preset fingerprint information;

stop refreshing the display page of the application to be unlocked, when the fingerprint information does not match the preset fingerprint information and the display page of the application to be unlocked has not been refreshed completely; and save the display page of the application to be unlocked that has not been refreshed completely;

wherein the processor being configured to evoke the executable program codes stored in the memory to perform the actions of comparing the fingerprint information acquired with the preset fingerprint information and refreshing the display page of the application to be unlocked in parallel is configured to evoke the executable program codes stored in the memory to:

compare the fingerprint information with the preset fingerprint information; and refresh the display page of the application to be unlocked while continuing performing the action of comparing the fingerprint ridges with the preset fingerprint information, when a matching degree between the fingerprint information and the preset fingerprint information reaches a first preset threshold before the fingerprint comparison is completed, wherein the first preset threshold is less than a second preset threshold, and the second preset threshold refers to a matching degree when the fingerprint information matches the preset fingerprint information;

wherein the processor being configured to evoke the executable program codes stored in the memory to display the refreshed display page of the application to be unlocked, when the fingerprint information matches the preset fingerprint information is configured to evoke the executable program codes stored in the memory to:

display the refreshed display page of the application to be unlocked, when the fingerprint information matches the preset fingerprint information and the display page of the application to be unlocked has been refreshed completely.

6. The terminal of claim 5, wherein the processor being configured to evoke the executable program codes stored in the memory to refresh the display page of the application to be unlocked is configured to evoke the executable program codes stored in the memory to:

obtain update-data of the application to be unlocked; and refresh the display page of the application to be unlocked on the basis of the update-data.

* * * * *